(12) United States Patent
Park et al.

(10) Patent No.: US 10,817,228 B2
(45) Date of Patent: Oct. 27, 2020

(54) HOST DEVICE AND METHOD FOR PERFORMING NETWORK DIAGNOSIS ON IMAGE FORMING DEVICE, IMAGE FORMING DEVICE ON WHICH NETWORK DIAGNOSIS IS PERFORMED, AND METHOD FOR CONTROLLING SAME

(71) Applicant: HEWLETT-PACKARD DEVELOPMENT COMPANY, L.P., Spring, TX (US)

(72) Inventors: Hyun-wook Park, Suwon-si (KR); Deok-Hee Boo, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/243,622

(22) Filed: Jan. 9, 2019

(65) Prior Publication Data

US 2019/0146721 A1 May 16, 2019

Related U.S. Application Data

(63) Continuation of application No. PCT/KR2017/007010, filed on Jul. 3, 2017.

(30) Foreign Application Priority Data

Aug. 18, 2016 (KR) ........................ 10-2016-0104980

(51) Int. Cl.
*G06F 3/12* (2006.01)

(52) U.S. Cl.
CPC ................ *G06F 3/121* (2013.01); *G06F 3/12* (2013.01); *G06F 3/1236* (2013.01); *G06F 3/1292* (2013.01)

(58) Field of Classification Search
None
See application file for complete search history.

(56) References Cited

U.S. PATENT DOCUMENTS

| 6,516,427 B1 | 2/2003 | Keyes et al. |
| 2003/0110413 A1 | 6/2003 | Bernklau-Halvor |

(Continued)

FOREIGN PATENT DOCUMENTS

| KR | 10-2004-0095682 A | 11/2004 |
| KR | 10-2006-0067686 A | 6/2006 |

(Continued)

*Primary Examiner* — Andrew H Lam
(74) *Attorney, Agent, or Firm* — Jefferson IP Law, LLP

(57) ABSTRACT

A host device for performing network diagnostics on an image forming apparatus is provided. The host device includes a communicator to receive, from the image forming apparatus, diagnostic raw data used for the network diagnostics on the image forming apparatus and receive, from a policy-providing server outside the image forming apparatus, a diagnostic policy that is a criterion of the network diagnostics, a memory storing a computer-executable instruction, at least one processor to execute the computer-executable instruction to generate a network diagnostics result of the image forming apparatus based on the diagnostic raw data and the diagnostic policy, and an input/output unit to output the network diagnostics result. The network diagnostics is performed on the image forming apparatus without upgrading the image forming apparatus, despite a change in the diagnostic policy for the network diagnostics.

13 Claims, 12 Drawing Sheets

(56) References Cited

U.S. PATENT DOCUMENTS

| | | | | |
|---|---|---|---|---|
| 2005/0086333 A1* | 4/2005 | Chefalas | ............... | G06F 8/70 709/223 |
| 2008/0162993 A1 | 7/2008 | Oh | | |
| 2008/0263398 A1* | 10/2008 | Mori | ............... | H04L 41/06 714/25 |
| 2014/0013156 A1* | 1/2014 | Cho | ............... | G06F 11/0793 714/30 |
| 2016/0259599 A1* | 9/2016 | Cho | ............... | G06F 11/3476 |

FOREIGN PATENT DOCUMENTS

| | | |
|---|---|---|
| KR | 10-2007-0022460 A | 2/2007 |
| KR | 10-2009-0010521 A | 1/2009 |
| KR | 10-2014-0005768 A | 1/2014 |

\* cited by examiner

| DIAGNOSTIC RAW DATA INFORMATION : nd.xml |
|---|
| <?xml version="1.0" encoding="UTF-8" ?> |
| -<NetworkDiagnostic> |
| - <General> |
| - <Ethernet> |
|    <PHYChipInstall> INSTALL </PHYChipInstall> |
|    <PHYChipType> RTL8211E </PHYChipType> |
|    - <EthernetConfig> |
|      <OnOff> ENABLED </OnOff> |
|      <Speed>AUTO</OnOff> |
|    </EthernetConfig> |
|    </EthernetLinkStatus> UP </EthernetLinkStatus> |
|    </EthernetLinkSpeed> 100,FULL </EthernetLinkStatus> |
|    - </EthernetLinkStatistic> |
|      <RxPacket>1234 </RxPacket> |
|      <RxPacket>1234 </TxPacket> |
|      <TxPacket>1234 </TxPacket> |
|      <LastISRStatus>1234 </LastISRStatus> |
|      <EEECount>1234 <EEECount> |
|      <LinkCount> 1234 </LinkCount> |
|      <LinkChangeCountPerHour>1234 <LinkChangeCountPerHour> |

FIG. 9

Check Rules  901

```
<CASE ID ND_102 severity warning category ethernet>
    <CONDITIONS oper="AND">
    <CONDITIONS path="general/ethernet" value="EMBEDDED" oper="EQ" CHECK="1"/>
    <CONDITIONS path="ethernet/phychipinstall" value="INSTALL" oper= oper="EQ" check="1"/>
    <CONDITIONS path="ethernet/ethernetconfig/onoff"="DISABLED" oper= oper="EQ"/>
    </CONDITIONS>
```

ACTION GUIDE  903

THE ETHERNET PORT IS DISABLED. IN ORDER TO BE CONNECTED TO THE NETWORK, THE ETHERNET PORT SHOULD BE TURNED ON. PLEASE TURN ON THE ETHERNET PORT IN NETWORK SETTING MENU.

FIG. 11

PRINTER NETWORK DIAGNOSTICS RESULT

1100

PRINTER DIAGNOSTICS  CLIENT ID : 0000005068

THIS IS THE NETWORK DIAGNOSTICS RESULT OF THE SELECTED PRINTER.
FOR FURTHER DIAGNOSTICS, PLEASE SELECT DIAGNOSTIC ITEM(S) AND CLICK THE
'REPERFORM DIAGNOSTICS' BUTTON.

VIEW ENTIRE RESULT | VIEW NETWORK SETTING

| BASIC DIAGNOSTICS | STATE | DIAGNOSTICS RESULT |
|---|---|---|
| ETHERNET | CONNECTED | 0/7 (CASES) |
| Wi-Fi | NOT INSTALLED | 1/3 (CASES) |
| NETWORK SETTING | — | 1/13 (CASES) |
| IP ADDRESS SETTING | — | 0/7 (CASES) |

| ☐ ADVANCED SETTINGS | STATE | DIAGNOSTICS RESULT |
|---|---|---|
| ☐ INTERNET CONNECTION | — | — |
| ☐ GOOGLE CLOUD PRINT | — | — |
| ☐ Samsung Cloud Print | — | — |
| ☐ SMTP SERVER | — | — |

REPERFORM DIAGNOSTICS    < BACK   END

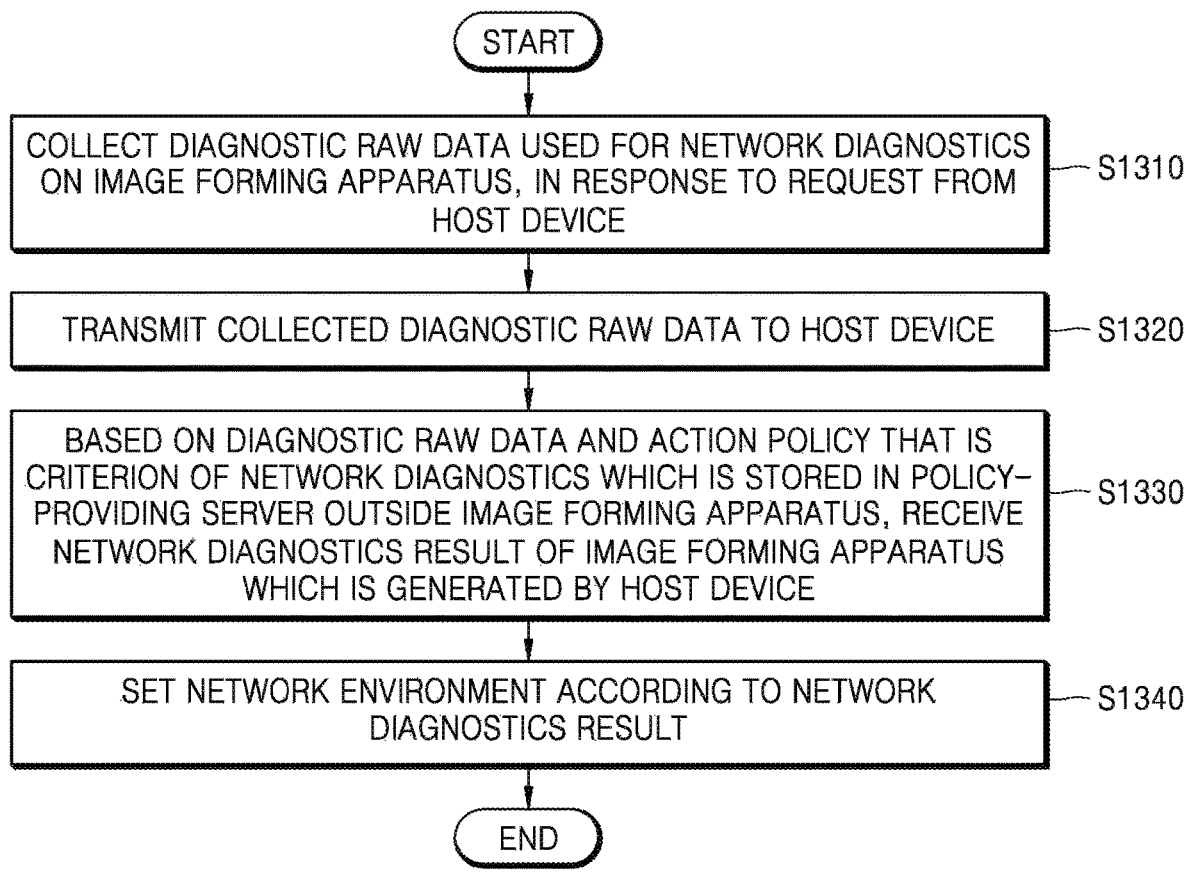

HOST DEVICE AND METHOD FOR PERFORMING NETWORK DIAGNOSIS ON IMAGE FORMING DEVICE, IMAGE FORMING DEVICE ON WHICH NETWORK DIAGNOSIS IS PERFORMED, AND METHOD FOR CONTROLLING SAME

BACKGROUND ART

To perform network diagnostics on an image forming apparatus, errors codes regarding all types of network-related errors that can occur in the image forming apparatus should be stored in advance in the image forming apparatus. Thus, the image forming apparatus should have separate storage space for the error codes. In a case where network-related errors that do not match with the error codes stored in advance occur, it is impossible to proceed with the network diagnostics. Also, whenever new functions are added to the image forming apparatus, diagnostic items and error codes corresponding to the newly added functions are prepared and added in an upgrade to the image forming apparatus and a host device.

BRIEF DESCRIPTION OF DRAWINGS

The above and other aspects, features, and advantages of certain examples of the disclosure will be more apparent from the following description taken in conjunction with the accompanying drawings, in which:

FIG. 8 is a diagram of an example of diagnostic raw data when an image forming apparatus transmits the diagnostic raw data to a host device in response to a request for the diagnostic raw data from the host device, according to an example.

FIG. 9 is a diagram of an example of a diagnostic policy and an action policy when a policy-providing server transmits the diagnostic policy and/or the action policy to a host device in response to a request for the diagnostic policy and/or the action policy from the host device, according to an example.

FIG. 11 illustrates a user interface indicating a network diagnostics result on a host device, according to an example.

FIG. 13 is a flowchart of a method of controlling an image forming apparatus on which network diagnostics are performed, according to an example.

Throughout the drawings, it should be noted that like reference numbers are used to depict the same or similar elements, features, parts, components, and structures.

DETAILED DESCRIPTION

Figure 1:
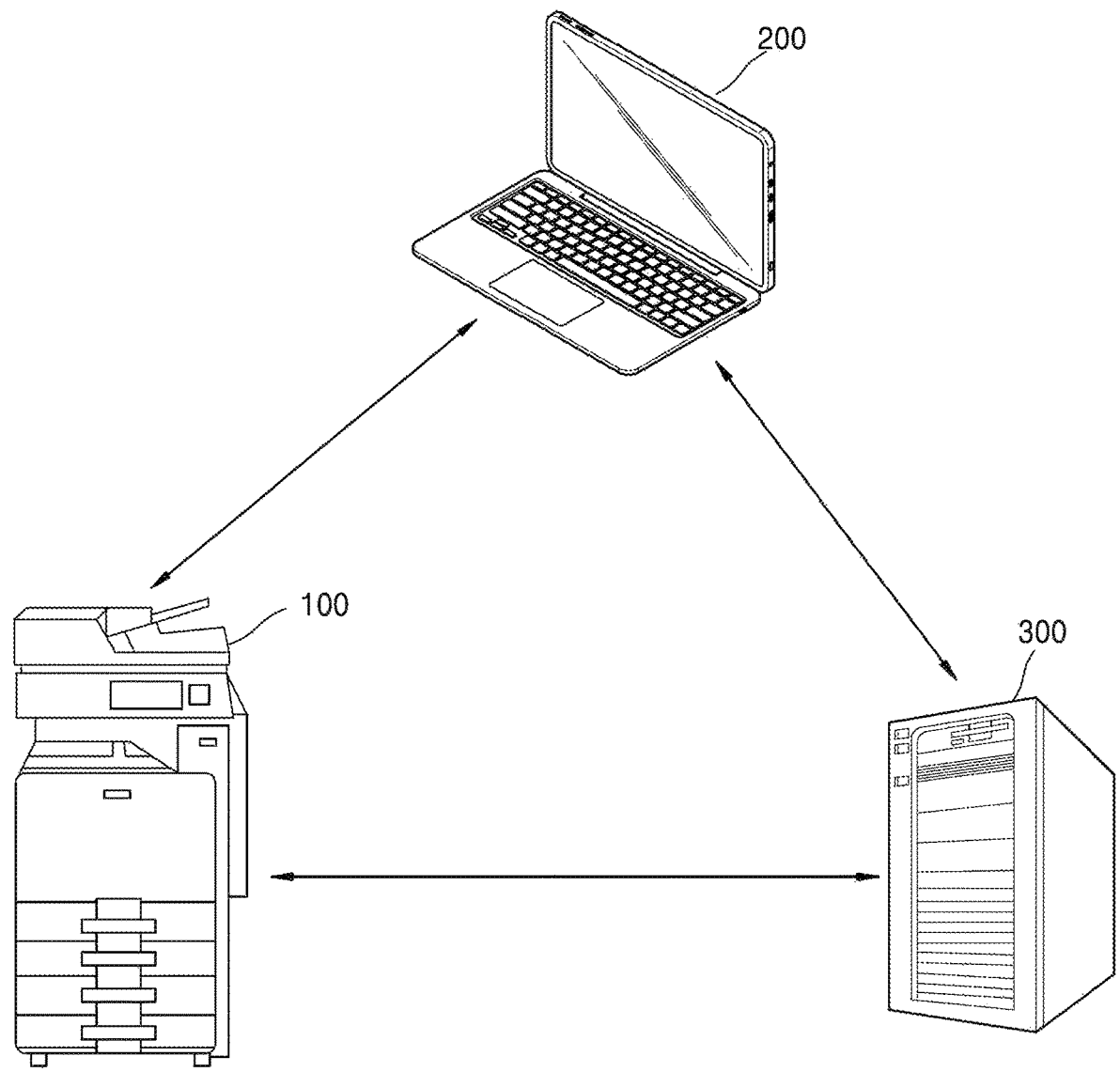
FIG. 1 is a diagram for explaining an environment in which an image forming apparatus, a host device, and a policy-providing server are connected to one another, according to an example.

Hereinafter, various examples will be provided with reference to the attached drawings. The examples below are to be considered illustrative and do not restrict or limit the scope of the disclosure. It shall be understood that content that one of ordinary skill in the art may easily infer from the descriptions and examples falls within the scope of the present disclosure.

It will be understood that when an element is referred to as being "connected to" another element, the element can be "directly connected to" the other element or "indirectly (e.g., electrically) connected to" the other element. It will be further understood that the terms "comprises" and/or "includes" used herein specify the presence of stated features or components, but do not preclude the presence or addition of one or more other features or components, unless otherwise defined.

It will be further understood that although the terms "first," "second," etc. may be used herein to describe various components, these components should not be limited by these terms. These components are only used to distinguish one component from another.

In the following description, the expression "image forming job" may denote image-related jobs (e.g., printing, copying, scanning, or faxing) such as forming images, generating, storing, transmitting, etc. image files, and the term "job" may indicate an image forming job as well as a series of processes necessarily conducted to perform the image forming job.

Also, an "image forming apparatus" may be any of devices, for example, a printer, a scanner, a copier, a fax machine, a multi-function printer (MFP), and any device, for example, a display device, which can perform an image forming job.

Also, a "hard copy" may indicate a job of printing an image on a print medium such as paper, and a "soft copy" may indicate a job of printing an image on a display device such as a television (TV) or a monitor, or on a memory.

Also, "content" may be any type of data that is a target of an image forming job, for example, a picture, an image, a document file, etc.

Also, "print data" may be data converted into a format printable by a printer.

Also, a "scan file" may be a file generated by a scanner after scanning an image.

Also, a "user" may be a person who uses an image forming apparatus or a device connected to an image forming apparatus in a wired or wireless manner and conducts a job related to an image forming job. In addition, an "administrator" may be a person who has authority to access all functions of an image forming apparatus and a system. The "user" and the "administrator" may be the same person.

The following examples are related to a host device and a method of performing network diagnostics on an image forming apparatus, the image forming apparatus on which the network diagnostics are performed, and a method of controlling the image forming apparatus. Matters that are well known to one of ordinary skill in the art to which examples below pertain will not be described in detail.

FIG. 1 is a diagram for explaining an environment in which an image forming apparatus, a host device, and a policy provision server are connected to one another, according to an example.

Referring to FIG. 1, an image forming apparatus 100, a host device 200, and a policy provision server 300 may be connected to one another via wired/wireless communication. For example, the host device 200 may transmit a signal for controlling the image forming apparatus 100 to the image forming apparatus 100 or may send a request for data, which is necessary to manage the image forming apparatus 100, to the policy provision server 300. The image forming apparatus 100 may transmit, to the host device 200 or the policy provision server 300, information about the image forming apparatus 100 or information about an image forming job.

Figure 2:
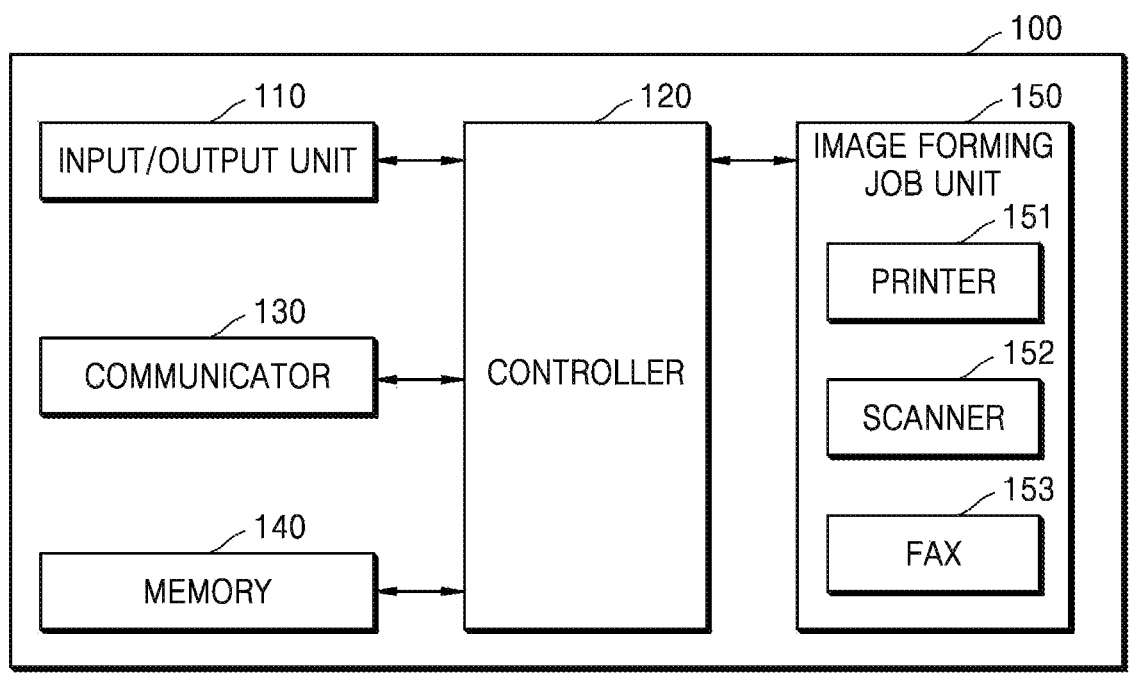
FIG. 2 is a diagram of a structure of an image forming apparatus, such as the image forming apparatus of FIG. 1, according to an example.

FIG. 2 is a diagram of a structure of an image forming apparatus, such as the image forming apparatus of FIG. 1, according to an example.

Referring to FIG. 2, the image forming apparatus 100 according to an example may include an input/output unit 110, a controller 120, a communicator 130, a memory 140, and an image forming job unit 150. Also, although not shown, the image forming apparatus 100 may further include a power supply to supply power to each component. One of ordinary skill in the art would understand that other general-purpose components may be further included in the image forming apparatus 100 in addition to the components shown in FIG. 2.

The input/output unit 110 may include an input unit, which receives an input, etc. of performing an image forming job from a user, and an output unit which displays a result of performing the image forming job or information about a state of the image forming job unit 150, etc. For example, the input/output unit 110 may include an operation panel for receiving a user input, a display panel for displaying a screen, and the like.

In more detail, the input unit may include one or more devices, for example, a keyboard, a physical button, a touch screen, a camera, a microphone, and the like, which may receive various types of user inputs. Also, the output unit may include, for example, a display panel, a speaker, or the like. However, the present disclosure is not limited thereto. The input/output unit 110 may include devices supporting various inputs and outputs.

The controller 120 may control operations of the image forming apparatus 100 and may include at least one processor such as a central processing unit (CPU). The controller 120 may control other components included in the image forming apparatus 100 to allow the other components to perform operations corresponding to user inputs received through the input/output unit 110. The controller 120 may include at least one processor specialized for each function or may be an integrated processor.

For example, the controller 120 may execute programs stored in the memory 140, read data or files stored in the memory 140, or store new files in the memory 140.

The communicator 130 may perform wired/wireless communication with other devices or a network. To this end, the communicator 130 may include a communication module (i.e., a transceiver) supporting at least one of various wired/wireless communication methods. For example, the communication module may be in a form of a chipset or may be a sticker/barcode (e.g., a sticker including an NFC tag) including information necessary for communication, or the like.

The wireless communication may include, for example, at least one of Wireless Fidelity (Wi-Fi), Wi-Fi Direct, Bluetooth, Ultra-Wide Band (UWB), Near Field Communication (NFC), and the like. The wired communication may include, for example, at least one of a universal serial bus (USB), a High Definition Multimedia Interface (HDMI), and the like.

The communicator 130 may be connected to an external device outside the image forming apparatus 100 and may receive/transmit signals or data from/to the external device. For example, referring again to FIG. 1, the image forming apparatus 100 is connected to the host device 200. The communicator 130 may transmit the signals or data received from the host device 200 to the controller 120 or signals or data generated by the controller 120 to the host device 200. For example, when the communicator 130 receives a print command signal or print data from the host device 200, the controller 120 may output the received print data by using a printer 151.

The communicator 130 may be directly connected to the policy provision server 300 and may receive/transmit signals or data. Also, the communicator 130 may be connected to the host device 200 via the policy provision server 300. That is, the communicator 130 of the image forming apparatus 100 may receive/transmit signals or data from/to a communicator 230 of the host device 200 via the policy provision server 300.

In the memory 140, programs such as applications may be installed and various types of data such as files may be stored. The controller 120 may access and use the data stored in the memory 140, or may store new data in the memory 140. Also, the controller 120 may execute the programs stored in the memory 140. In addition, the controller 120 may install, in the memory 140, applications received from the outside through the communicator 130.

The image forming job unit 150 may perform an image forming job such as printing, copying, scanning, or faxing.

FIG. 2 shows that the image forming job unit 150 includes the printer 151, a scanner 152, and a fax 153. However, according to necessity, the image forming job unit 150 may include only some of the components shown in FIG. 2 or may further include components for performing other image forming jobs in addition to the components shown in FIG. 2.

The printer 151 may produce an image on a recording medium by using various print methods such as an electro-photography method, an inkjet method, a thermal transfer method, a thermal method, and the like.

The scanner 152 may irradiate light onto paper and receive reflected light, thereby reading an image recorded on the paper. Examples of an image sensor that reads an image from paper may include, for example, a charge coupled device (CCD), a contact type image sensor (CIS), and the like. The scanner 152 may have a flatbed structure in which paper is located at a fixed location and an image is read while an image sensor moves, a document feed structure in which an image sensor is located at a fixed location and paper is fed, or a combined structure thereof.

The fax 153 may share a structure for scanning an image with the scanner 152, share a structure for printing a received file with the printer 151, and transmit a scanned file to a destination or receive a file from the outside.

When a network diagnostics instruction of the user is input to the host device 200, the image forming apparatus 100 receives a request for diagnostics raw data used for the network diagnostics from the host device 200 and may operate as follows.

The memory 140 storing computer executable instructions may store a collection program for collecting the diagnostics raw data used for the network diagnostics on the image forming apparatus 100, and firmware.

At least one processor forming the controller 120 may execute the computer executable instructions stored in the memory 140 and thus may collect the diagnostics raw data used for the network diagnostics on the image forming apparatus 100 in response to a request from the host device 200. For example, the at least one processor forming the controller 120 may collect diagnostics raw data regarding operation of network hardware or regarding a wired/wireless network connection. Also, the at least one processor forming the controller 120 may use a current setting value of a network configuration parameter and may attempt a network access test and various network operations, thus collecting a result.

The communicator 130 may transmit the collected diagnostics raw data to the host device 200. The diagnostics raw data may be transmitted to the host device 200 in a certain format such as an Extensible Markup Language (XML), Trusted Execution Technology (TXT), or comma-separated values (CSV).

When the host device 200 completes the network diagnostics, the communicator 130 may receive, from the host device 200, a network diagnostics result of the image forming apparatus 100 that is generated by the host device 200, based on a diagnostic policy that becomes a criterion of the network diagnostics stored in the policy provision server 300 outside the image forming apparatus 100, and the diagnostics raw data.

The at least one processor forming the controller 120 may set a network environment in accordance with a network diagnostics result. Alternatively, the input/output unit 110 may provide a user interface for network environment settings when the user needs to change the network environment settings according to the network diagnostics result of the image forming apparatus 100.

The communicator 130 may receive an action guide corresponding to the network diagnostics result, based on an action policy that is a criterion of the action guide stored in the policy provision server 300.

Figure 3:
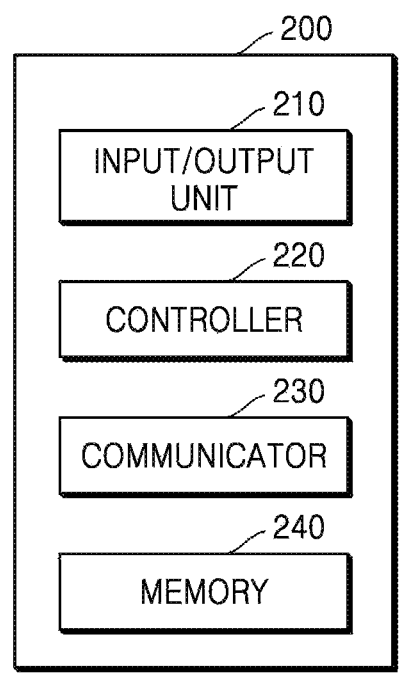
FIG. 3 is a diagram of a structure of a host device, such as the host device of FIG. 1, according to an example.

FIG. 3 is a diagram of a structure of a host device, such as the host device of FIG. 1, according to an example.

Referring to FIG. 3, the host device 200 may include an input/output unit 210, a controller 220, the communicator 230, and a memory 240. The controller 220 may execute programs stored in the memory 240 and may transmit signals or data generated due to the execution of the program to the image forming apparatus 100 through the communicator 230, thereby controlling an image forming job. The host device 200 may include, for example, a smart phone, a tablet computer, a personal computer (PC), a home appliance, medical equipment, a camera, a wearable device, or the like.

When a network diagnostics instruction is input to the host device 200 from the user, the host device 200 may operate as follows.

The memory 240 storing the computer executable instruction may store a diagnostics program for performing the network diagnostics on the image forming apparatus 100.

At least one processor forming the controller 220 may execute the computer executable instruction stored in the memory 240 and thus may execute the diagnostics program.

The communicator 230 may send, to the image forming apparatus 100, a request for the diagnostics raw data used for the network diagnostics on the image forming apparatus 100 and may receive the diagnostics raw data from the image forming apparatus 100.

The communicator 230 may receive the diagnostic policy that is the criterion of the network diagnostics, from the policy provision server 300 outside the image forming apparatus 100. When there is a change in the diagnostic policy stored in the policy provision server 300, the communicator 230 may update the diagnostic policy stored in the policy provision server 300 and may receive an updated diagnostic policy from the policy provision server 300. The communicator 230 may receive the action policy that is the criterion of the action guide from the policy provision server 300. When there is a change in the action policy stored in the policy provision server 300, the communicator 230 may update the action policy stored in the policy provision server 300 and may receive an updated action policy from the policy provision server 300.

The memory 240 may store the diagnostics raw data received from the image forming apparatus 100, and the diagnostic policy or action policy received from the policy provision server 300.

The at least one processor forming the controller 220 may generate the network diagnostics result of the image forming apparatus 100, based on the diagnostics raw data and the diagnostic policy. The network diagnostics result may be stored in the memory 240.

The input/output unit 210 may output the network diagnostics result so that the user may know the network diagnostics result. When the user sends, through the input/output unit 210, a request for a measure that may be taken according to the network diagnostics result, the at least one processor forming the controller 220 may output the action guide corresponding to the network diagnostics result through the input/output unit 210.

The communicator 230 may transmit the network diagnostics result to the policy provision server 300 and may receive the action guide corresponding to the network diagnostics result from the policy provision server 300, based on the action policy that is a criterion of the action guide stored in the policy provision server 300. The input/output unit 210 may output the received action guide.

The communicator 230 may transmit the network diagnostics result to the policy provision server 300 and may receive, from the policy provision server 300, the action guide corresponding to the network diagnostics result, based on the action policy that is the criterion of the action guide stored in the policy provision server 300. The input/output unit 210 may output the received action guide.

Figure 4:
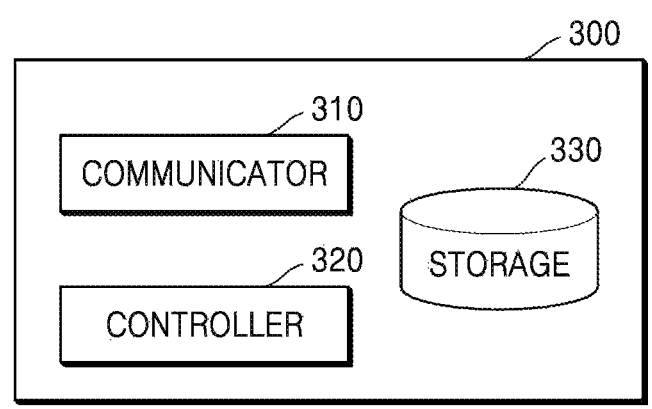
FIG. 4 is a diagram of a structure of a policy providing server, such as the policy-providing server of FIG. 1, according to an example.

FIG. 4 is a diagram of a structure of a policy providing server, such as the policy-providing server of FIG. 1, according to an example.

Referring to FIG. 4, the policy provision server 300 may include a communicator 310, a controller 320, and a storage 330. The policy provision server 300 may be driven as a web server by using the communicator 310 and the controller 320.

The policy provision server 300 may receive a request for the diagnostic policy or the action policy from the host device 200 and, in response thereto, the policy provision server 300 may transmit the diagnostic policy or the action policy stored in the storage 330 to the host device 200.

When a new diagnostic policy or a new action policy are added, a service provider updates the diagnostic policy or the action policy to the policy provision server 300 and manages the diagnostic policy or the action policy to be stored in the policy provision server 300. When there are requests for the diagnostic policy or the action policy from the host device 200, the policy provision server 300 provides the host device 200 with the updated diagnostic policy or action policy. The host device 200 analyzes the diagnostics raw data of the image forming apparatus 100 according to a newly updated diagnostic policy and displays a new action guide on the screen according to a newly updated action policy.

Figure 5:
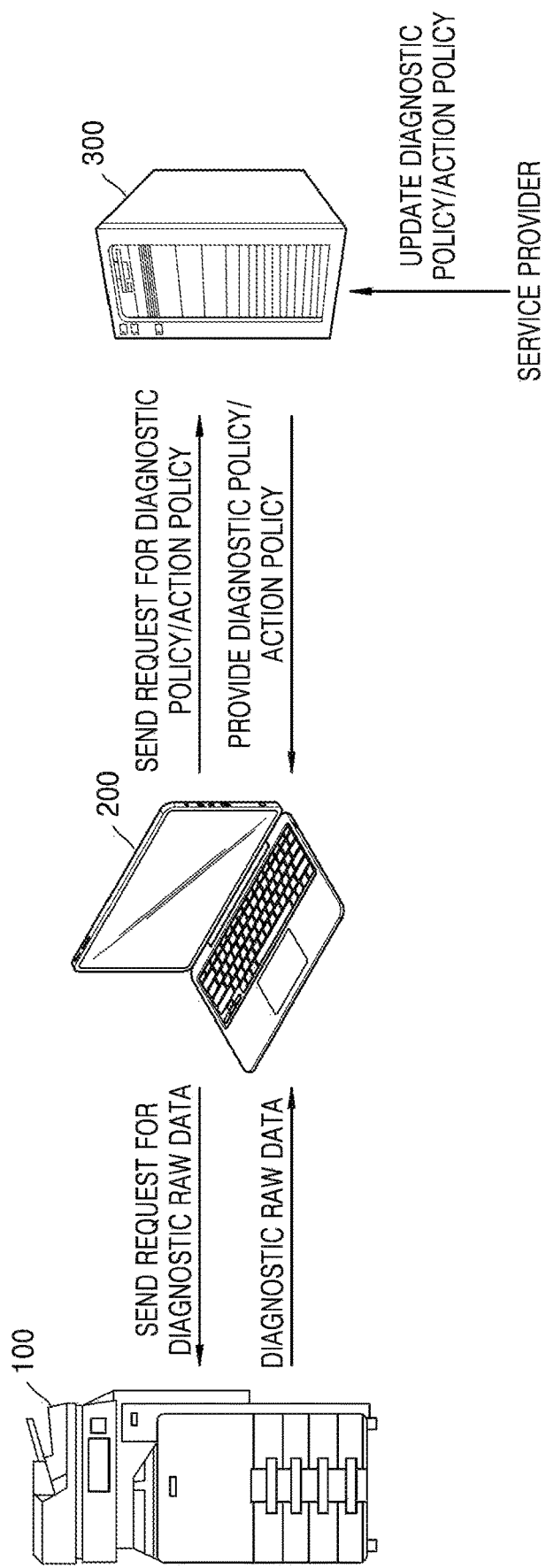
FIG. 5 is a diagram for explaining a network diagnostics process of an image forming apparatus, according to an example.

FIG. 5 is a diagram for explaining a network diagnostics process of an image forming apparatus, according to an example.

Referring to FIG. 5, the user executes a diagnostics program for network diagnostics by using the host device 200.

Figure 6:
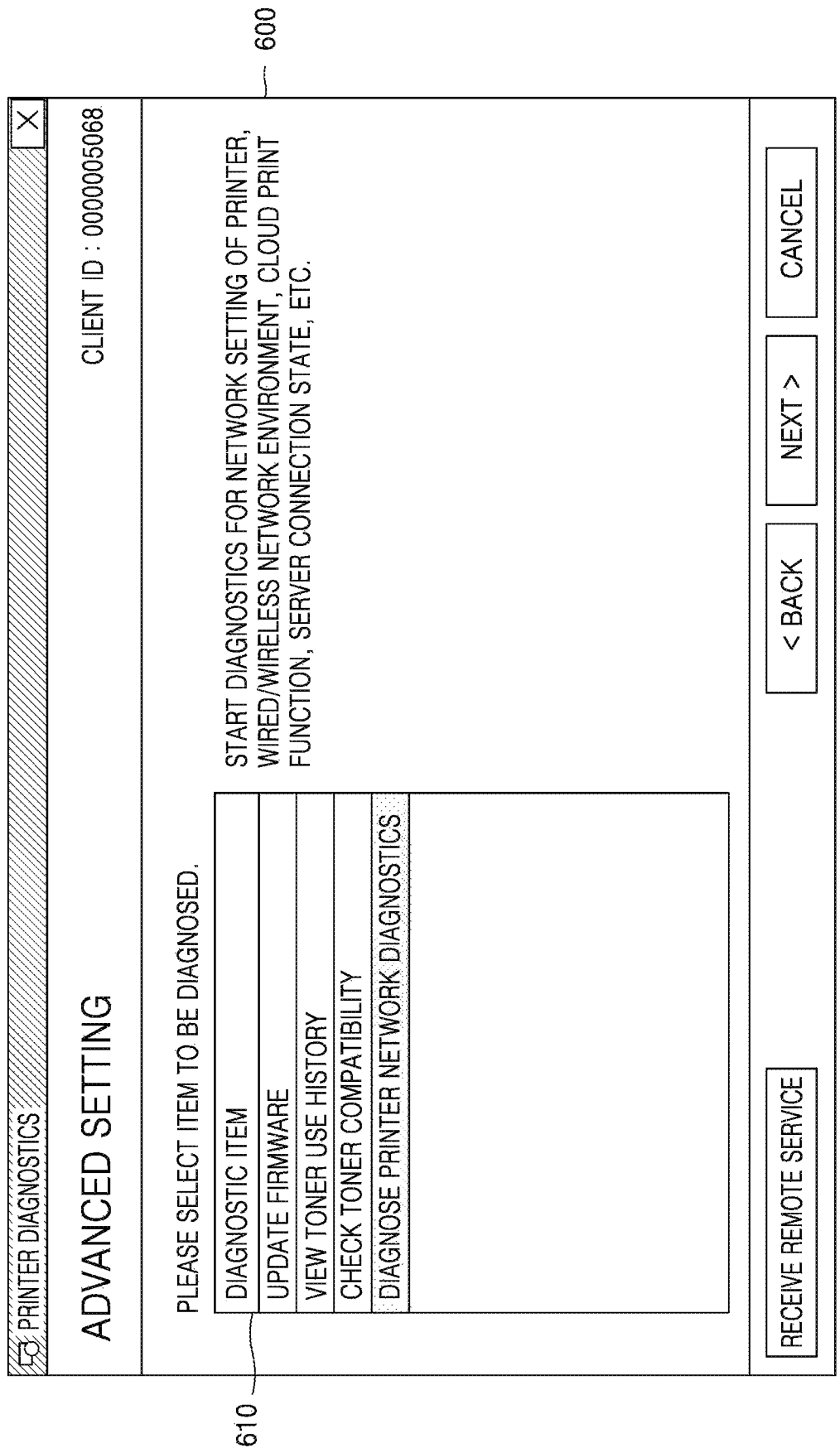
FIG. 6 illustrates a user interface that may be displayed when a diagnostics program is executed on a host device, according to an example.

FIG. 6 illustrates a user interface that may be displayed when a diagnostics program is executed on a host device, according to an example.

Referring to FIG. 6, a user interface 600 may be displayed on the input/output unit 210 of the host device 200 to allow for input of a network diagnostics instruction. For example, a user of the host device 200 may retrieve and select the image forming apparatus 100 that is subject to the network diagnostics and select from a menu 610 to start the desired diagnostics.

Figure 7:
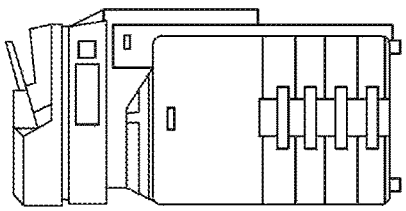
FIG. 7 illustrates a user interface of a host device for selecting an image forming apparatus that is subject to network diagnostics, according to an example.

FIG. 7 illustrates a user interface of a host device for selecting an image forming apparatus that is subject to network diagnostics, according to an example.

Referring to FIG. 7, when a diagnostics program is executed on the host device 200, a user interface 700 may be displayed on the input/output unit 210 for selecting the image forming apparatus 100 that is subject to the network diagnostics. For example, a menu 710 may be provided for a user to select the desired image forming apparatus.

Referring again to FIG. 5, according to a network diagnostics instruction of the user, the host device 200 sends a request for the diagnostics raw data to the image forming apparatus 100 that is subject to the network diagnostics. For collection of the diagnostics raw data, the image forming apparatus 100 may execute a collection program stored in the memory 140 and may collect a result of performing a network access test and various network operations, etc., based on diagnostics raw data regarding operation of network hardware, diagnostics raw data regarding a wired/wireless network connection, and current setting values of a network configuration parameter. The image forming apparatus 100 transmits the collected diagnostics raw data to the host device 200.

FIG. 8 is a diagram of an example of diagnostics raw data when an image forming apparatus transmits the diagnostics raw data to a host device in response to a request for the diagnostics raw data from the host device, according to an example.

Referring to FIG. 8, the diagnostics raw data 800 may be in a form of XML and indicates an installation state and a type of the Ethernet PHY chip. The diagnostics raw data 800 also indicates whether the Ethernet is in an enabled state or a disabled state and Ethernet speed is manually set or set according to a speed determination method according to automatic detection. According to the diagnostics raw data 800 shown in FIG. 8, the Ethernet PHY chip is installed, the type of the Ethernet PHY chip is "RTL8211E", the Ethernet is in the enabled status, and the Ethernet speed is automatically set. Also, the diagnostics raw data 800 indicates that an Ethernet link is connected to an external device such as a network switch and formed as 100 Mbps Full Duplex. Moreover, the diagnostics raw data 800 may include setting values and current state values regarding various network configuration parameters.

Referring again to FIG. 5, the host device 200 may send a request for the diagnostic policy to the policy provision server 300. The host device 200 may send a request for the action policy sequentially or simultaneously with the request for the diagnostic policy. The host device 200 may receive the diagnostic policy from the policy provision server 300 and may analyse the diagnostics raw data of the image forming apparatus 100 based on the received diagnostic policy and the diagnostics raw data received from the image forming apparatus 100.

FIG. 9 is a diagram of an example of a diagnostic policy and an action policy when a policy provision server transmits the diagnostic policy and/or the action policy to a host device in response to a request for the diagnostic policy and/or the action policy from the host device, according to an example.

Referring to FIG. 9, a setting value and a current state value of a network configuration parameter included in the diagnostics raw data collected by the image forming apparatus 100 are compared to each other, according to check rules 901 of the diagnostic policy. As illustrated in FIG. 9, whether the Ethernet is installed and is in a disabled state should be checked according to the check rules of the diagnostic policy. According to the example of FIG. 9, the Ethernet is "installed" and in the "disabled" state, and thus, an action guide 903 may be displayed on a screen of the host device 200.

Figure 10:
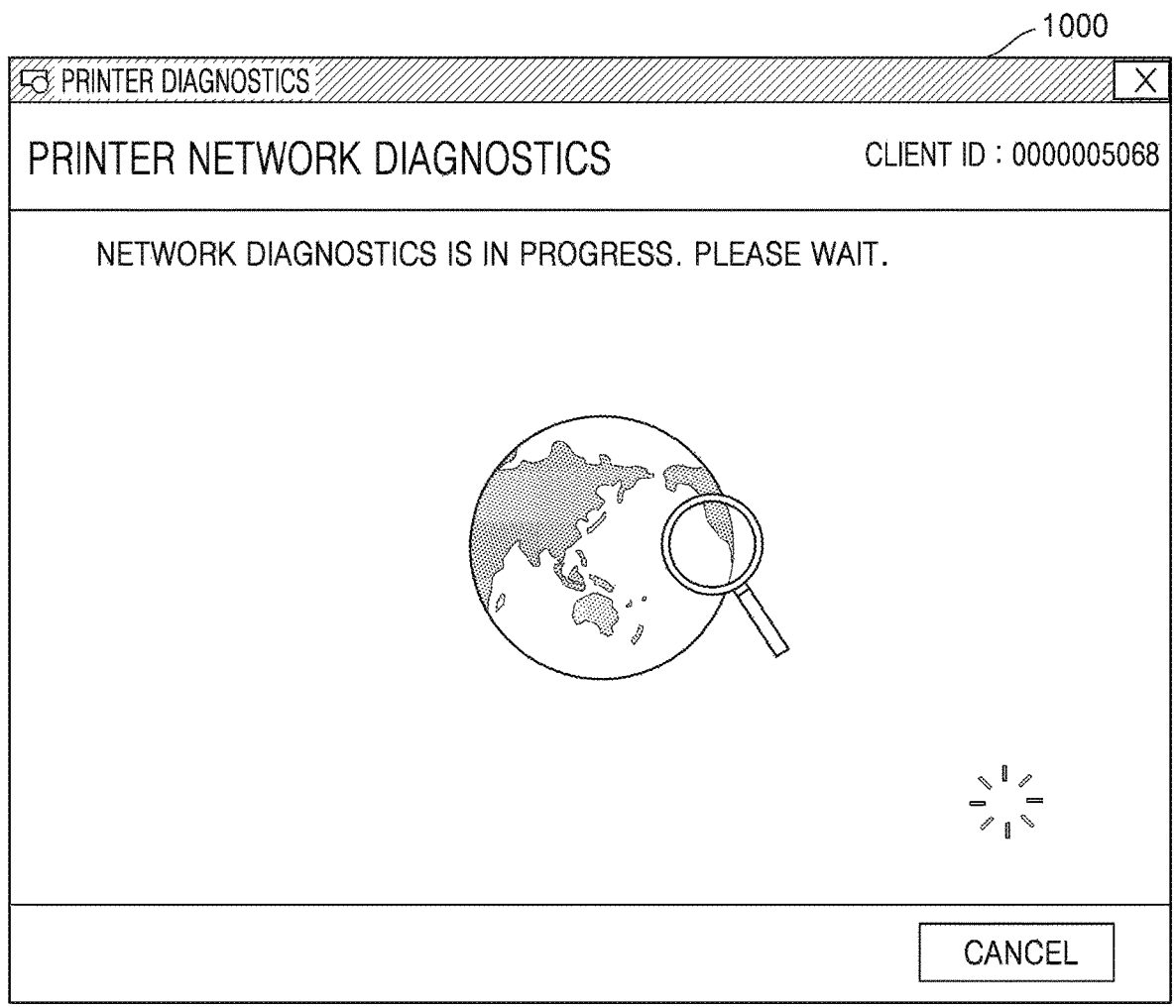
FIG. 10 illustrates a user interface for performing network diagnostics after a host device receives a network diagnostics instruction from a user, according to an example.

FIG. 10 illustrates a user interface for performing network diagnostics after a host device receives a network diagnostics instruction from a user, according to an example.

Referring to FIG. 10, a user interface 1000 indicating that the network diagnostics is in progress may be displayed on the screen before the network diagnostics on the image forming apparatus 100 is completed by the host device 200.

After performing the network diagnostics on the image forming apparatus 100, the host device 200 may display the network diagnostics result on the screen when a network error or a certain state, which is identified according to the diagnostic policy, is found.

FIG. 11 shows a user interface indicating a network diagnostics result on a host device, according to an example.

Referring to FIG. 11, when there is a user request, the host device 200 may display a solution capable of addressing a corresponding problem as an action guide.

As illustrated in network diagnostics results 1100 of FIG. 11, the number of times that diagnostics is performed for each diagnostic item and the number of actions taken may be displayed on the screen. When the user clicks a result of diagnostics for which an action is taken, the host device 200 may display an action guide on the screen.

The user may refer to the action guide displayed on the screen of the host device 200 and may address problems such as a network connection error by using the input/output unit 110 of the image forming apparatus 100 or the input/output unit 210 of the host device 200. The user may change the network configuration of the image forming apparatus 100 according to the action guide and may perform network re-diagnostics to check that the network configuration is appropriately set.

Figure 12:
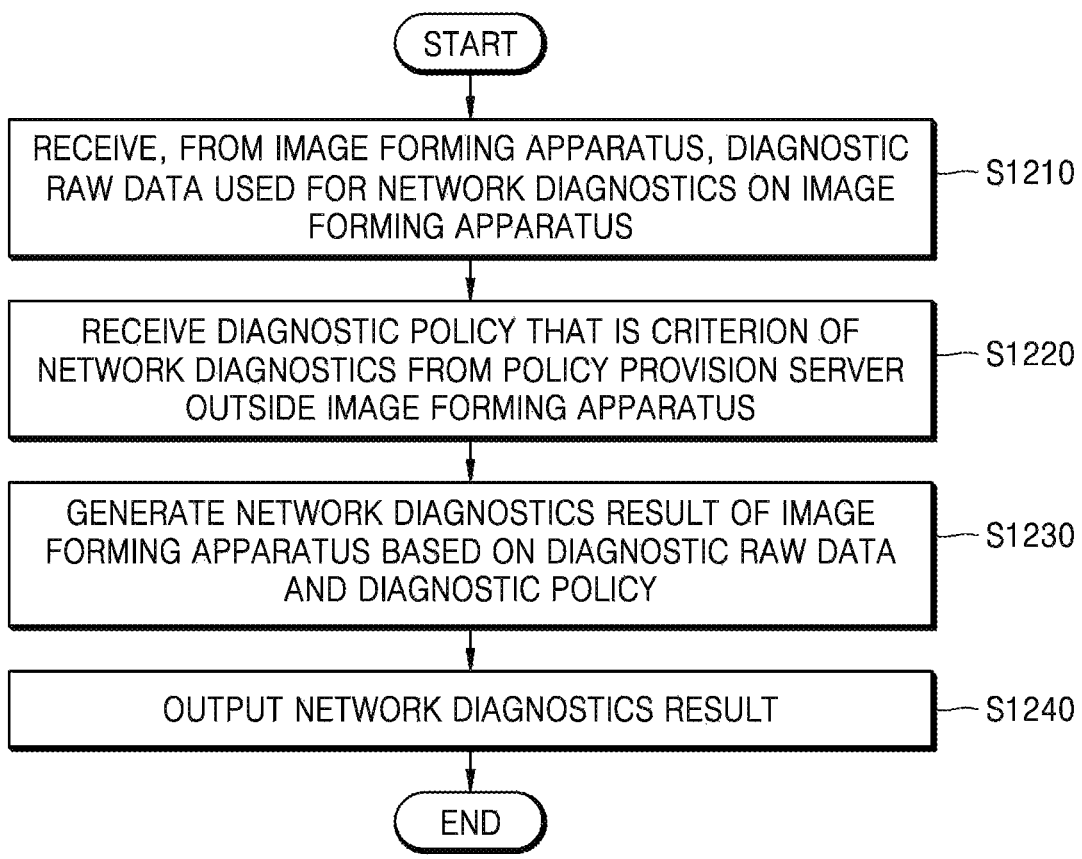
FIG. 12 is a flowchart of a method of performing network diagnostics on an image forming apparatus, according to an example.

FIG. 12 is a flowchart of a method of performing network diagnostics on an image forming apparatus, according to an example.

Referring to FIG. 12, the host device 200 receives, from the image forming apparatus 100, diagnostics raw data used for the network diagnostics on the image forming apparatus 100 in operation S1210.

In operation S1220, the host device 200 receives a diagnostic policy that is a criterion of the network diagnostics, from the policy provision server 300 outside the image forming apparatus 100. When there is a change in the diagnostic policy, the host device 200 updates the diagnostic policy stored in the policy provision server 300 and receives an updated diagnostic policy from the policy provision server 300.

In operation S1230, the host device 200 generates a network diagnostics result of the image forming apparatus 100, based on the diagnostics raw data and the diagnostic policy.

In operation S1240, the host device 200 outputs the network diagnostics result.

Furthermore, the host device 200 may receive, from the policy provision server 300, an action policy that is a criterion of an action guide and checks the action guide corresponding to the network diagnostics result based on the received action policy, thereby outputting the checked action guide.

Also, the host device 200 may transmit the network diagnostics result to the policy provision server 300 and may receive the action guide corresponding to the network diagnostics result from the policy provision server 300 based on the action policy that is the criterion of the action guide stored in the policy provision server 300, thereby outputting the received action guide.

FIG. 13 is a flowchart of a method of controlling an image forming apparatus on which network diagnostics are performed, according to an example.

Referring to FIG. 13, the image forming apparatus 100 collects diagnostics raw data used for the network diagnostics on the image forming apparatus 100 in response to a request from the host device 200 in operation S1310.

In operation S1320, the image forming apparatus 100 transmits the collected diagnostics raw data to the host device 200.

In operation S1330, the image forming apparatus 100 receives a network diagnostics result of the image forming apparatus 100 that is generated by the host device 200, based on a diagnostic policy that is a criterion of the network diagnostics that is stored in the policy provision server 300 outside the image forming apparatus 100, and the diagnostics raw data.

In operation S1340, the image forming apparatus 100 sets a network configuration according to the network diagnostics result.

Furthermore, the image forming apparatus 100 may receive an action guide corresponding to the network diagnostics result, based on an action policy that is the criterion of the action guide stored in the policy provision server 300.

Methods of performing network diagnostics on the image forming apparatus or methods of controlling the image forming apparatus on which the network diagnostics is performed may be written as programs executable by a computer and may be implemented in general-use digital computer that executes the programs using a non-transitory computer readable recording medium. Examples of the non-transitory computer readable recording medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, photomagnetic data storage devices, optical data storage devices, hard disks, solid state disks (SSDs), and any device capable of storing instructions or software, relevant data, data files, and data structures, and providing processors or computers with instructions or software, relevant data, data files, and data structures so that the processors or computers can execute the instructions.

While this disclosure has been particularly shown and described with reference to examples thereof, it will be understood by one of ordinary skill in the art that various changes in form and details may be made therein without departing from the spirit and scope of the disclosure as defined by the appended claims. The examples should be considered in descriptive sense only and not for purposes of limitation. Therefore, the scope of the disclosure is defined not by the description of the disclosure but by the appended claims, and all differences within the scope will be construed as being included in the present disclosure.

What is claimed is:

1. A host device for performing network diagnostics on an image forming apparatus, the host device comprising:
a communicator to:
   transmit, to the image forming apparatus, a request for diagnostic raw data used for the network diagnostics on the image forming apparatus,
   receive, from the image forming apparatus, the diagnostic raw data used for the network diagnostics on the image forming apparatus,
   transmit, to a policy-providing server outside the image forming apparatus, a request for a diagnostic policy, and
   receive, from the policy-providing server, the diagnostic policy, the diagnostic policy being a criterion of the network diagnostics;
a memory storing a computer-executable instruction;
at least one processor to execute the computer-executable instruction to generate a network diagnostics result of the image forming apparatus based on the diagnostic raw data and the diagnostic policy; and
an input/output unit to output the network diagnostics result,
wherein, when there is a change in the diagnostic policy, the communicator is further to update the diagnostic policy stored in the policy-providing server and receives an updated diagnostic policy from the policy-providing server, and
wherein the communicator is further to:
   transmit, to the policy-providing server, the network diagnostics result of the image forming apparatus, and
   receive, from the policy-providing server, an action guide corresponding to the network diagnostics result.

2. The host device of claim 1,
wherein the action guide is based on an action policy that is a criterion of the action guide stored in the policy-providing server,
wherein the at least one processor checks the action guide corresponding to the network diagnostics result, based on the action policy, and
wherein the input/output unit outputs the checked action guide.

3. The host device of claim 2, wherein, when there is a change in the action policy, the communicator updates the action policy stored in the policy-providing server and receives an updated action policy from the policy-providing server.

4. The host device of claim 1,
wherein the input/output unit outputs the received action guide.

5. A method of performing network diagnostics on an image forming apparatus, the method comprising:
transmitting, to the image forming apparatus, a request for diagnostic raw data used for the network diagnostics on the image forming apparatus;
receiving, from the image forming apparatus, the diagnostic raw data used for the network diagnostics on the image forming apparatus;
transmitting, to a policy-providing server outside the image forming apparatus, a request for a diagnostic policy;
receiving the diagnostic policy that is a criterion of the network diagnostics from the policy-providing server;
generating a network diagnostics result of the image forming apparatus, based on the diagnostic raw data and the diagnostic policy;
outputting the network diagnostics result;
transmitting, to the policy-providing server, the network diagnostics result of the image forming apparatus; and
receiving, from the policy-providing server, an action guide corresponding to the network diagnostics result,
wherein the receiving of the diagnostic policy comprises, when there is a change in the diagnostic policy, updating the diagnostic policy stored in the policy-providing server and receiving an updated diagnostic policy from the policy-providing server.

6. The method of claim 5, further comprising:
checking the action guide corresponding to the network diagnostics result, based on the action policy; and
outputting the checked action guide,
wherein the action guide is based on an action policy that is a criterion of the action guide stored in the policy-providing server.

7. The method of claim 5, further comprising:
outputting the received action guide.

8. A non-transitory computer-readable recording medium having recorded thereon instructions for executing a method of performing network diagnostics of an image forming apparatus on a computer, the computer-readable recording medium comprising:
instructions for transmitting, to the image forming apparatus, a request for diagnostic raw data used for the network diagnostics on the image forming apparatus;
instructions for receiving, from the image forming apparatus, the diagnostic raw data used for the network diagnostics on the image forming apparatus;
instructions for transmitting, to a policy-providing server outside the image forming apparatus, a request for a diagnostic policy;
instructions for receiving the diagnostic policy that is a criterion of the network diagnostics from the policy-providing server;
instructions for generating a network diagnostics result of the image forming apparatus, based on the diagnostic raw data and the diagnostic policy;
instructions for outputting the network diagnostics result;
instructions for transmitting, to the policy-providing server, the network diagnostics result of the image forming apparatus; and
instructions for receiving, from the policy-providing server, an action guide corresponding to the network diagnostics result,
wherein the instructions for receiving the diagnostic policy comprise, when there is a change in the diagnostic policy, updating the diagnostic policy stored in the policy-providing server and receiving an updated diagnostic policy from the policy-providing server.

9. An image forming apparatus on which network diagnostics are performed, the image forming apparatus comprising:
a memory storing computer-executable instructions;
at least one processor to execute the computer-executable instructions to collect diagnostic raw data used for performing the network diagnostics on the image forming apparatus, in response to a request from a host device; and
a communicator to:
transmit the collected diagnostic raw data to the host device,
receive a network diagnostics result of the image forming apparatus that is generated by the host device, based on the diagnostic raw data and a diagnostic policy that is a criterion of the network diagnostics that is stored in a policy-providing server outside the image forming apparatus, and
receive an action guide corresponding to the network diagnostics result from the host device,
wherein the at least one processor sets a network environment according to the action guide corresponding to the network diagnostics result, and
wherein, when there is a change in the diagnostic policy, the host device updates the diagnostic policy stored in the policy-providing server and receives an updated diagnostic policy from the policy-providing server.

10. The image forming apparatus of claim 9, wherein the action guide corresponds to the network diagnostics result based on an action policy that is a criterion of the action guide stored in the policy-providing server.

11. A method of controlling an image forming apparatus on which network diagnostics are performed, the method comprising:
collecting diagnostic raw data used for the network diagnostics on the image forming apparatus, in response to a request from a host device;
transmitting the collected diagnostic raw data to the host device;
receiving a network diagnostics result of the image forming apparatus that is generated by the host device, based on the diagnostic raw data and a diagnostic policy that is a criterion of the network diagnostics which is stored in a policy-providing server outside the image forming apparatus;
receiving an action guide corresponding to the network diagnostics result from the host device; and
setting a network environment according to the action guide corresponding to the network diagnostics result,
wherein, when there is a change in the diagnostic policy, the host device updates the diagnostic policy stored in the policy-providing server and receives an updated diagnostic policy from the policy-providing server.

12. The method of claim 11,
wherein the action guide corresponds to the network diagnostics result based on an action policy that is a criterion of an action guide stored in the policy-providing server, wherein the setting of the network environment comprises setting the network environment according to the network diagnostics result, in accordance with the action guide.

13. A non-transitory computer-readable recording medium having recorded thereon a program for executing a method of controlling an image forming apparatus on which network diagnostics are performed on a computer, the computer-readable recording medium comprising:

instructions for collecting diagnostic raw data used for the network diagnostics on the image forming apparatus, in response to a request from a host device;

instructions for transmitting the collected diagnostic raw data to the host device;

instructions for receiving a network diagnostics result of the image forming apparatus that is generated by the host device, based on the diagnostic raw data and a diagnostic policy that is a criterion of the network diagnostics which is stored in a policy-providing server outside the image forming apparatus;

instructions for receiving an action guide corresponding to the network diagnostics result from the host device; and instructions for setting a network environment according to the action guide corresponding to the network diagnostics result, wherein, when there is a change in the diagnostic policy, the host device updates the diagnostic policy stored in the policy-providing server and receives an updated diagnostic policy from the policy-providing server.

\* \* \* \* \*